(12) United States Patent
You et al.

(10) Patent No.: US 10,509,273 B2
(45) Date of Patent: Dec. 17, 2019

(54) DISPLAY ELEMENT

(71) Applicant: LG Chem, Ltd., Seoul (KR)

(72) Inventors: Jung Sun You, Daejeon (KR); Yoon Kyung Kwon, Daejeon (KR); Dong Hyun Oh, Daejeon (KR); Sung Joon Min, Daejeon (KR); Jin Hong Kim, Daejeon (KR); Jung Woon Kim, Daejeon (KR); Eun Jung Lim, Daejeon (KR)

(73) Assignee: LG Chem, Ltd. (KR)

( * ) Notice: Subject to any disclaimer, the term of this patent is extended or adjusted under 35 U.S.C. 154(b) by 3 days.

(21) Appl. No.: 15/553,388

(22) PCT Filed: Jun. 10, 2016

(86) PCT No.: PCT/KR2016/006173
§ 371 (c)(1),
(2) Date: Aug. 24, 2017

(87) PCT Pub. No.: WO2016/200199
PCT Pub. Date: Dec. 15, 2016

(65) Prior Publication Data
US 2018/0074377 A1  Mar. 15, 2018

(30) Foreign Application Priority Data

Jun. 12, 2015 (KR) .................. 10-2015-0083449
Jun. 15, 2015 (KR) .................. 10-2015-0083961

(51) Int. Cl.
*G02F 1/1343* (2006.01)
*G02F 1/1335* (2006.01)
(Continued)

(52) U.S. Cl.
CPC ...... *G02F 1/134363* (2013.01); *G02F 1/1339* (2013.01); *G02F 1/133502* (2013.01);
(Continued)

(58) Field of Classification Search
CPC ... G02F 2001/133796; G02F 1/134363; G02F 1/133502; G02F 1/133514; G02F 1/133528; G02F 1/1339
(Continued)

(56) References Cited

U.S. PATENT DOCUMENTS 5,830,386 A * 11/1998 Nohira ............... C07D 239/26
252/299.61
6,201,592 B1   3/2001 Terashita et al.
(Continued)

FOREIGN PATENT DOCUMENTS

GB    2324618 A * 10/1998   ........ G02F 1/133711
JP    H10301115 A    11/1998
(Continued)

OTHER PUBLICATIONS

Search report from International Application No. PCT/KR2016/006173, dated Sep. 7, 2016.
(Continued)

*Primary Examiner* — Charles S Chang
(74) *Attorney, Agent, or Firm* — Lerner, David, Littenberg, Krumholz & Mentlik, LLP

(57) ABSTRACT

A display element, a method for manufacturing the same, and a use thereof are provided. The display element can induce a decrease in driving voltage without reducing a difference in a cell gap, have durability by ensuring proper adhesion characteristics, and, specifically, can effectively overcome a problem of the display element including a vertical alignment adhesive layer, in particular, a problem of increasing driving voltage, which can be generated when the thickness is increased so as to improve the adhesion characteristics.

14 Claims, 1 Drawing Sheet

(51) Int. Cl.
*G02F 1/1339* (2006.01)
*G02F 1/1337* (2006.01)

(52) U.S. Cl.
CPC .. *G02F 1/133514* (2013.01); *G02F 1/133528* (2013.01); *G02F 2001/133796* (2013.01)

(58) Field of Classification Search
USPC .......................................................... 349/123
See application file for complete search history.

(56) References Cited

U.S. PATENT DOCUMENTS

| | | | |
|---|---|---|---|
| 2005/0243264 A1* | 11/2005 | Sikharulidze | B82Y 20/00 349/177 |
| 2009/0147167 A1 | 6/2009 | Park | |
| 2011/0051064 A1 | 3/2011 | Matsumori et al. | |
| 2011/0092004 A1 | 4/2011 | Kim et al. | |
| 2016/0109754 A1* | 4/2016 | Seike | 349/96 |
| 2016/0115389 A1 | 4/2016 | Lim et al. | |

FOREIGN PATENT DOCUMENTS

| | | |
|---|---|---|
| JP | 3924779 B2 | 6/2007 |
| JP | 2008102260 A | 5/2008 |
| JP | 2011053351 A | 3/2011 |
| JP | 2011154202 A | 8/2011 |
| KR | 20030039401 A | 5/2003 |
| KR | 20060108787 A | 10/2006 |
| KR | 100794075 B1 | 1/2008 |
| KR | 20080079866 A | 9/2008 |
| KR | 20100083246 A | 7/2010 |
| KR | 20100090282 A | 8/2010 |
| KR | 20110020536 A | 3/2011 |
| KR | 20110041253 A | 4/2011 |
| KR | 20150007998 A | 1/2015 |
| KR | 20150055376 A | 5/2015 |

OTHER PUBLICATIONS

Extended European Search Report including Written Opinion for Application No. EP16807839.2 dated Dec. 17, 2018.

* cited by examiner

[Figure 1]
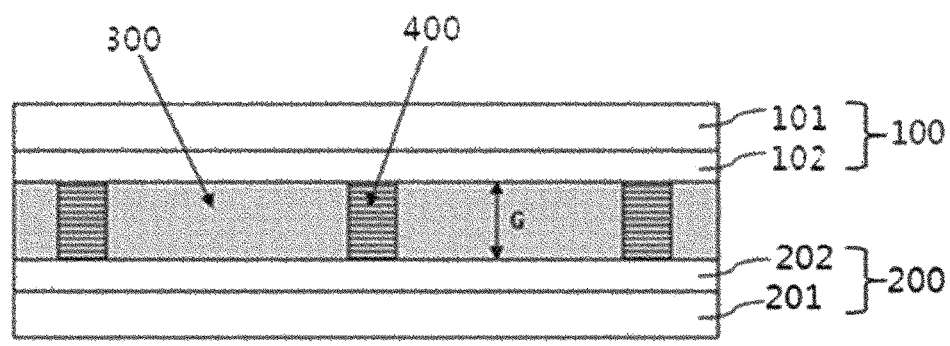
[Figure 2]
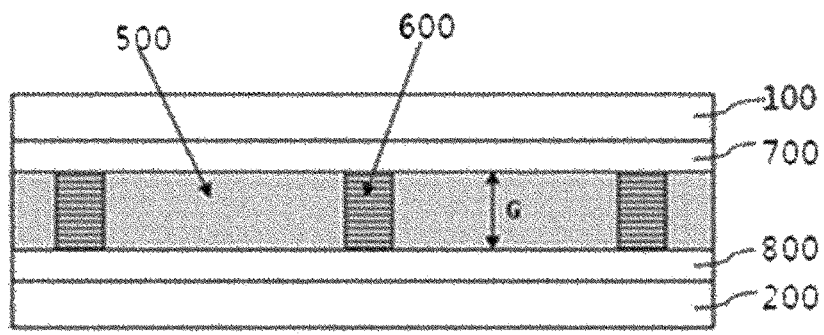

DISPLAY ELEMENT

CROSS-REFERENCE TO RELATED APPLICATIONS

This application is a national phase entry under 35 U.S.C § 371 of International Application No. PCT/KR2016/006173, filed Jun. 10, 2016, which claims priority to Korean Patent Application No. 10-2015-0083449, filed on Jun. 12, 2015 and Korean Patent Application No. 10-2015-0083961, filed on Jun. 15, 2015, the disclosures of which are incorporated herein by reference.

TECHNICAL FIELD

The present application relates to a display element, a method for manufacturing the same, and a use thereof.

BACKGROUND ART

In modern times, as the society becomes a full-fledged information age, the display field for processing and displaying a large amount of information has been rapidly developed, and accordingly various display devices have been developed.

A specific example of such a display device may include a liquid crystal display device (LCD), an organic light emitting device (OLED), a plasma display device (PDP), a field emission display device (FED), an electroluminescence display device (ELD), an electrochemical display device (ECD), an electrophoretic display (EPD) or a suspended particle display device (SPD), and the like, and these display devices are widely used, while exhibiting excellent performance of thinning, lightening and low power consuming.

Such a display device is manufactured by using a method of positioning a barrier rib pattern comprising spacers or the like and an adhesive layer between substrates disposed to be spaced apart from each other to maintain the cell gap and injecting the corresponding material in accordance with a desired driving mode.

At this time, the thickness of the adhesive layer may be increased to improve the adhesive force, but there may be a problem that the driving voltage increases as the thickness of the adhesive layer increases.

Therefore, there is a growing need for manufacturing a display device that can secure excellent optical characteristics while having an appropriate thickness range.

PRIOR ART DOCUMENT (Patent Document 1) Korean Laid-Open Patent Publication No. 2010-0083246

DISCLOSURE

Technical Problem

The present application provides a display element, a method for manufacturing the same, and a use thereof.

In particular, the present application provides a display element capable of effectively overcoming the problem of a display element comprising a vertical alignment adhesive layer, specifically, the problem to increase the driving voltage that may occur when the thickness is increased in order to increase the adhesive property.

The present application also provides a use of such a display element, for example, a display device comprising the display element.

Technical Solution

The present application relates to a display element, a method for manufacturing the same, and a use thereof.

By incorporating a predetermined amount of functional nanoparticles into a vertical alignment adhesive layer to impart electrical conduction characteristics or provide a predetermined dielectric constant value to the vertical alignment adhesive layer, the display element according to the present application can effectively induce application of electric field into an intermediate layer, thereby generating the effect of reducing the cell gap deviation, and ultimately reducing the driving voltage of the display element.

That is, in a display element comprising a first substrate; a second substrate arranged opposite to the first substrate; and an intermediate layer positioned between the first substrate and the second substrate, the present application is characterized by comprising a vertical alignment adhesive layer bonding the first substrate and the second substrate and containing functional nanoparticles.

In the present application, the term "display element" may mean an element formed to be usable in one configuration of a display device by having a layer comprising a substance capable of transmitting or blocking light by an external action or a substance capable of emitting light by an external action between an upper substrate and a lower substrate.

The term "vertical alignment adhesive layer" herein may mean a layer comprising a vertical alignment adhesive having an adhesive force capable of adhering a first substrate and a second substrate while imparting a vertical orientation force to a substance present in an intermediate layer.

FIG. 1 shows an exemplary display element according to the present application.

Specifically, in FIG. 1, a display element comprising an intermediate layer (300) positioned between a first substrate (100) and a second substrate (200) is disclosed. In addition, the display element may further comprise a barrier rib pattern (400) that serves to maintain a cell gap between the first substrate (100) and the second substrate (200).

The display element of the present application comprises a first substrate and a second substrate arranged opposite to the first substrate.

In one example, as shown in FIG. 1, the first substrate (100) and the second substrate (200) may comprise a base material layer (101, 201) and an electrode layer (102, 202) formed on the base material layer (101, 201).

The first substrate and the second substrate may comprise, for example, a base material layer.

As the base material layer, a known material that is applicable to a display element can be utilized without limitation. In one example, as the base material layer, one having a film shape can be used.

Specifically, as the base material layer, a glass film, a silicon film, an inorganic film, or a plastic film, and the like can be used, without being limited thereto. The inorganic film may mean a film containing an inorganic substance such as quartz or ITO (indium tin oxide). As the base material layer, an optically isotropic base material layer or an optically anisotropic base material layer such as a retardation layer, and the like can be used.

In one example, the silicon film may be a crystalline, semi-crystalline or amorphous silicon film.

In one example, as the plastic base material layer, TAC (triacetyl cellulose); COP (cyclo olefin copolymer) such as norbornene derivatives; PMMA (poly(methyl methacrylate)); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketon); PPS (polyphenylsulfone); PEI (polyetherimide); PEN (polyethylenemaphthatlate); PET (polyethyleneterephtalate); PI (polyimide); PSF (polysulfone); PAR (polyarylate) or an amorphous fluororesin and the like can be exemplified.

In the base material layer, if necessary, a coating layer of gold, silver, or a silicon compound such as silicon dioxide or silicon monoxide, or a coating layer such as an antireflection layer can also be present.

In some cases, the base material layer may be a flexible one having a predetermined elastic modulus. In one example, the base material layer may be a flexible layer having an elastic modulus ranging from 0.05 MPa to 5,000 MPa or from 0.5 MPa to 2,500 MPa.

The first substrate and the second substrate may comprise, for example, an electrode layer. The electrode layer may serve to apply an external action, for example, an electric field so that a light modulating material contained in the intermediate layer can transmit or block the incident light, or a light emitting material contained in the intermediate layer can emit light by itself.

In one example, the electrode layer may comprise, but is not limited to, a conductive polymer, a conductive metal, a conductive nanowire, or a metal oxide such as ITO (indium tin oxide).

The electrode layer may be, for example, one formed by depositing a conductive polymer, a conductive metal, a conductive nanowire, or a metal oxide such as ITO (indium tin oxide).

The display element of the present application comprises a vertical alignment adhesive layer positioned between a first substrate and a second substrate.

When the first substrate and the second substrate are bonded together, the vertical alignment adhesive layer imparts appropriate adhesiveness to the two substrates to play a role of securing durability of the display element and at the same time imparts vertical alignment characteristics to a material present in an intermediate layer, whereby the display element can have vertical alignment driving characteristics as a whole.

The vertical alignment adhesive layer comprises functional nanoparticles.

Here, the term "functional nanoparticles" means nanodimensional particles having a function of changing the electrical properties of the vertical alignment adhesive layer, such as imparting electrical conduction properties or a predetermined dielectric constant value to the vertical alignment adhesive layer.

In addition, ultimately, the effect of decreasing the driving voltage of the display element may vary depending on the inclusion and content range of the functional nanoparticles.

In one example, the vertical alignment adhesive layer may comprise functional nanoparticles in a ratio of 0.005% by weight to 60% by weight. In a specific example, the vertical alignment adhesive layer may comprise functional nanoparticles in a ratio of 0.05% by weight to 50% by weight or 0.1% by weight to 40% by weight. Within the above range, the desired driving voltage reduction characteristic can be ensured.

The type of the functional nanoparticles is not particularly limited as long as they satisfy the above-described definition and can provide a driving voltage reduction characteristic to the display element, but conductive nanoparticles or dielectric nanoparticles, and the like can be exemplified, for example.

In the present application, the term "conductive particles" means particles which conduct electricity and exhibit a predetermined electric conductivity. The conductive particles are referred to as particles for convenience, but their shapes and appearances are not particularly limited.

The conductive particles are for imparting a predetermined electric conductivity to the vertical alignment adhesive layer, and for example, may have electric conductivity of $1.0 \times 10^1$ S/m or more. In another example, the electric conductivity may be $1.0 \times 10^2$ S/m or more, $1.0 \times 10^3$ S/m or more, $1.0 \times 10^4$ S/m or more, or $1.0 \times 10^5$ S/m or more. Considering the purpose of imparting high electric conductivity to the vertical alignment adhesive layer, the upper limit of the electric conductivity of the conductive particles is not particularly limited, but may be, for example, $1.0 \times 10^{12}$ S/m or less.

In the present application, the term "dielectric particles" means particles having a predetermined dielectric constant as a material having a function of keeping electricity. The dielectric particles are referred to as particles for convenience, but their shapes and appearances are not particularly limited.

The shape of the functional nanoparticles may be in the form of a tube, a wire, a rod, or a ring as well as a particle form.

In one example, the functional nanoparticles may have a spherical nanoparticle, nanotube, nanowire, nanorod, or nanoring shape. Here, the term "nanoring" may mean a nanostructure which is a spherical shape nanoparticle, but includes a hollow portion, thereby being a ring shape as a whole.

In one example, the functional nanoparticles may be spherical nanoparticles.

Specifically, the functional nanoparticles can be exemplified by ITO nanoparticles, Ag nanowires, or silica nanoparticles, and the like, but is not limited thereto.

In the present application, among the above-described functional particles, those having appropriate compatibility with an adhesive resin to be described below and thus having physical properties that can be evenly dispersed in the vertical alignment adhesive layer, can be appropriately adopted and contained in the vertical alignment adhesive layer.

The vertical alignment adhesive layer of the present application can provide the electrically conductive property or a predetermined dielectric constant value to the vertical alignment adhesive layer by comprising the above-described functional nanoparticles in a predetermined content range. Specifically, the vertical alignment adhesive layer may exhibit a predetermined electric conductivity difference or dielectric constant difference depending on whether or not the functional nanoparticles are contained.

In one example, the vertical alignment adhesive layer may comprise functional nanoparticles to satisfy the following equation 1.

$$G_i \times 100 \leq G_N \leq 1 \times 10^{10} \text{ S/m} \qquad \text{[Equation 1]}$$

In Equation 1 above, $G_N$ represents an electric conductivity value (S/m) of the vertical alignment adhesive layer comprising functional nanoparticles, and $G_i$ represents an electric conductivity value (S/m) of the vertical alignment adhesive layer comprising no functional nanoparticle.

When the vertical alignment adhesive layer satisfying Equation 1 above is included in the display element, it is possible to effectively induce the application of the electric field to the intermediate layer, thereby achieving an effect of substantially reducing the cell gap difference, and ultimately, achieving an effect of lowering the driving voltage of the display element.

Specifically, the electric conductivity value attainable by comprising the functional particles having a predetermined electric conductivity in the vertical alignment adhesive layer may be 100 times or more, 110 times or more, 120 times or more, 130 times or more, 140 times or more, or 150 times or more, relative to the electric conductivity value attainable when the functional particles are not contained in the vertical alignment adhesive layer. Within the range as above, application of an electric field to the intermediate layer can be promoted, and the desired driving voltage reduction effect can be exhibited.

More specifically, the electric conductivity value of the vertical alignment adhesive layer may be $1.0 \times 10^{-5}$ S/m or more, for example. Within the electric conductivity range as above, the adhesive layer has a relatively low resistance value as compared with the intermediate layer, so that application of the electric field into the intermediate layer can be promoted. In another example, the adhesive layer may have an electric conductivity of $2.0 \times 10^{-5}$ S/m or more, or $2.1 \times 10^{-5}$ S/m or more. The upper limit of the electric conductivity value is not particularly limited, and may be, for example, $1 \times 10^{10}$ S/m or less.

In another example, the vertical alignment adhesive layer may comprise functional nanoparticles so as to satisfy the following equation 2.

$$C_i \times 1.5 \leq C_N \leq 50 \qquad \text{[Equation 2]}$$

In Equation 2 above, $C_N$ represents a dielectric constant value of the vertical alignment adhesive layer comprising functional nanoparticles and $C_i$ represents a dielectric constant value of the vertical alignment adhesive layer comprising no functional nanoparticle.

That is, the dielectric constant value attainable by comprising a predetermined amount of the functional particles in the vertical alignment adhesive layer may be 1.5 times or more, 1.6 times or more, 1.7 times or more, 1.8 times or more, 1.9 times or more, or 2 times or more, relative to the dielectric constant value attainable when the functional particles are not contained in the vertical alignment adhesive layer. Within the range as above, application of an electric field to the intermediate layer can be promoted, and the desired drive voltage effect can be exhibited.

Specifically, the dielectric constant value of the vertical alignment adhesive layer may be, for example, 3.00 or more. Within the dielectric constant range as above, the adhesive layer has a relatively low resistance value, so that application of the electric field into the intermediate layer can be promoted. In another example, the vertical alignment adhesive layer may have a dielectric constant of 3.50 or 3.70 or higher. The upper limit of the dielectric constant value is not particularly limited, and may be, for example, 50 or less.

When the vertical alignment adhesive layer comprises the functional nanoparticles so as to satisfy the above-mentioned Equation 1 or 2, the desired driving voltage reduction characteristic of the display element can be secured.

The vertical alignment adhesive layer may also comprise a vertical alignment silicone-based adhesive in order to impart the adhesive property.

In one example, the vertical alignment silicone-based adhesive may be a cured product of a composition comprising a curable silicone compound.

The kind of the curable silicone compound is not particularly limited, and for example, a heat curable silicone compound or an ultraviolet curable silicone compound can be used.

In one example, the curable silicone compound may be an addition curable silicone compound.

Specifically, the addition curable silicone compound can be exemplified by (1) an organopolysiloxane containing at least two alkenyl groups in the molecule, and (2) an organopolysiloxane containing at least two silicon-bonded hydrogen atoms in the molecule, but is not limited thereto. The silicone compound as above can form, for example, a cured product by an addition reaction in the presence of a catalyst to be described below.

A more specific example of the organopolysiloxane (1) that can be used in the present application may include a dimethylsiloxane-methylvinylsiloxane copolymer blocked with trimethylsiloxane groups at both terminals of the molecular chain, methylvinylpolysiloxane blocked with trimethylsiloxane groups at both terminals of the molecular chain, a dimethylsiloxane-methylvinylsiloxane-methylphenylsiloxane copolymer blocked with trimethylsiloxane groups at both terminals of the molecular chain, dimethylpolysiloxane blocked with dimethylvinylsiloxane groups at both terminals of the molecular chain, methylvinylpolysiloxane blocked with dimethylvinylsiloxane groups at both terminals of the molecular chain, a dimethylsiloxane-methylvinylsiloxane copolymer blocked with dimethylvinylsiloxane groups at both terminals of the molecular chain, a dimethylsiloxane-methylvinylsiloxane-methylphenylsiloxane copolymer blocked with dimethylvinylsiloxane groups at both terminals of the molecular chain, an organopolysiloxane copolymer containing siloxane units represented by $R^1{}_2SiO_{1/2}$, siloxane units represented by $R^1{}_2R^2SiO_{1/2}$ and siloxane units represented by $SiO_{4/2}$, an organopolysiloxane copolymer containing siloxane units represented by $R^1{}_2R^2SiO_{1/2}$ and siloxane units represented by $SiO_{4/2}$, an organopolysiloxane copolymer containing siloxane units represented by $R_1R_2SiO_{2/2}$ and siloxane units represented by $R_1SiO_{3/2}$ or siloxane units represented by $R_2SiO_{3/2}$ and a mixture of two or more thereof, but is not limited thereto.

Here, $R^1$ is a hydrocarbon group other than an alkenyl group, and specifically, may be an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like.

Here, $R^2$ is also an alkenyl group, and specifically, may be a vinyl group, an allyl group, a butenyl group, a pentenyl group, a hexenyl group or a heptenyl group, and the like.

A more specific example of the organopolysiloxane (2) that can be used in the present invention may include methylhydrogenpolysiloxane blocked with trimethylsiloxane groups at both terminals of the molecular chain, a dimethylsiloxane-methylhydrogen copolymer blocked with trimethylsiloxane groups at both terminals of the molecular chain, a dimethylsiloxane-methylphenylsiloxane-methylphenylsiloxane copolymer blocked with trimethylsiloxane groups at both terminals of the molecular chain, dimethylpolysiloxane blocked with dimethylhydrogensiloxane groups at both terminals of the molecular chain, a dimethylsiloxane-methylphenylsiloxane copolymer blocked with dimethylhydrogensiloxane groups at both terminals of the molecular chain, methylphenylpolysiloxane blocked with dimethylhydrogensiloxane groups at both terminals of the molecular chain, an organopolysiloxane copolymer containing siloxane units represented by $R^1_3SiO_{1/2}$, siloxane units represented by $R^1_2HSiO_{1/2}$ and siloxane units represented by $SiO_{4/2}$, an organopolysiloxane copolymer containing siloxane units represented by $R^1_2HSiO_{1/2}$ and siloxane units represented by $SiO_{4/2}$, an organopolysiloxane copolymer containing siloxane units represented by $R^1HSiO_{2/2}$ and siloxane units represented by $R^1SiO_{3/2}$ or siloxane units represented by $HSiO_{3/2}$, and a mixture of two or more thereof, but is not limited thereto. Here, $R^1$ is a hydrocarbon group other than an alkenyl group, and specifically, may be an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like.

The type of the vertical alignment silicone adhesive that can be included in the vertical alignment adhesive layer is not particularly limited, may be appropriately selected depending on the intended use, and for example, a solid adhesive, a semi-solid adhesive, an elastic adhesive or a liquid adhesive may be appropriately selected and used. The solid-state adhesive, semi-solid adhesive or elastic adhesive may be referred to as a so-called pressure sensitive adhesive (PSA) and may be cured before the objects to be bonded are adhered. The liquid adhesive may be referred to as a so-called optical clear resin (OCR) and may be cured after the objects to be bonded are adhered.

In a more specific example, as the adhesive resin contained in the vertical alignment adhesive layer, a polydimethyl siloxane adhesive or a polymethylvinyl siloxane adhesive, which is the PSA type adhesive, can be used, and an alkoxy silicone adhesive, which is the OCR type adhesive having vertical alignment force, can be used, without being limited thereto.

The adhesive resin may be selected from the above-mentioned ones in consideration of whether or not the functional particles can be evenly dispersed in the vertical alignment adhesive layer to secure a desired electric conductivity value or dielectric constant value of the vertical alignment adhesive layer.

The thickness of the vertical alignment adhesive layer may be appropriately selected in consideration of optical characteristics and the like depending on the cell gap difference between the substrates, and for example, may be within a range of 0.1 µm to 100 µm. The vertical alignment adhesive layer according to the present application can attain an appropriate driving voltage reduction effect while maintaining the thickness range.

The display element of the present application comprises an intermediate layer. The intermediate layer is located between the first substrate and the second substrate.

In the present application, the term "intermediate layer" may mean a layer positioned between the upper and lower substrates of the display element and formed so as to be capable of transmitting or blocking light, or emitting light depending on whether or not an external action is applied.

In the present application, the term "external action" may mean all the external factors, for example, an external voltage, and the like, that may affect the behavior of a substance contained in the intermediate layer, for example, a light modulating material or a light emitting material. Therefore, a state without external action may mean a state in which no external voltage or the like is applied.

In one example, the intermediate layer may be a light modulating layer containing a light modulating material or a light emitting layer containing a light emitting material.

In the present application, the term "light modulating layer" may mean a layer containing a light modulating material capable of transmitting or blocking light depending on whether or the external action is applied.

In one example, the light modulating layer may be a liquid crystal layer, an electrochromic material layer, an electrophoretic material layer, or a dispersed particle alignment layer.

Specifically, the intermediate layer may be a liquid crystal layer containing a liquid crystal compound as a light modulating material. When the light modulating layer is a liquid crystal layer, the display element may be a liquid crystal display element in which the orientation of the liquid crystal compound in the liquid crystal layer changes depending on whether or not the external action is applied, whereby light is scattered or transmitted.

When the light modulating layer is a liquid crystal layer, the liquid crystal layer comprises a liquid crystal compound.

In one example, the liquid crystal compound may exist, for example, in a state in which the orientation is switchable. The term "orientation is switchable" may mean that the alignment direction of the liquid crystal compound can be changed by the external action.

For example, the liquid crystal compound may be one whose orientation is switchable, such that the alignment direction of the liquid crystal compound in the vertically aligned state may also be converted by the external action, and the orientation in which the liquid crystal compound returns to the vertically aligned state again when the external action disappears.

The liquid crystal compound may be a mesogenic compound.

In the present application, the term "mesogenic compound" means a compound having a mesogenic structure, and the term "mesogen" means a structure capable of inducing a structural order in crystals, where the category of the mesogen may include, typically, any type of rigid structure known to be capable of inducing alignment of molecules to a given direction in a liquid crystal compound.

The kind of the mesogenic compound usable in the present application is not particularly limited. In one example, the present application may use, for example, a nematic compound, a smectic compound, a cholesteric compound or the like, which is a known liquid crystal compound, as the mesogenic compound.

In one example, the mesogenic compound may be a non-reactive mesogenic compound having no reactive group.

The mesogenic compound may have, for example, a difference ($\Delta n = Ne - No$) between an extraordinary refractive index (Ne) and a normal refractive index (No) in a range of about 0.05 to 3, about 0.05 to 2.5, about 0.05 to 2, about 0.05 to 1.5, or about 0.07 to 1.5. In such a range, the liquid crystal composition can be applied to various light modulating devices to exhibit proper performance. Unless otherwise specified, the refractive index in the present application means a refractive index for light having a wavelength of about 550 nm.

The mesogenic compound may be, for example, a compound, referred to as a so-called n-type liquid crystal in the art, in which a difference ($\Delta\varepsilon=\varepsilon_e-\varepsilon_o$) between an extraordinary dielectric anisotropy ($\varepsilon_e$) and an ordinary dielectric anisotropy ($\varepsilon_o$) represents a negative value.

In one example, the mesogenic compound may have a difference ($\Delta\varepsilon=\varepsilon_e-\varepsilon_o$) between the extraordinary dielectric anisotropy ($\varepsilon_e$) and the ordinary dielectric anisotropy ($\varepsilon_o$) of about −40 or more, about −35 or more, about −30 or more, or about −25 or more. In addition, the upper limit of the dielectric anisotropy difference ($\Delta\varepsilon=\varepsilon_e-\varepsilon_o$) is not particularly limited and may be about −15 or less, about −10 or less, about −8 or less, about −6 or less, about −4 or less, about −3.5 or less, or about −3 or less.

The range of the dielectric anisotropy in the mesogenic compound is not particularly limited as long as it exhibits the difference ($\Delta\varepsilon=\varepsilon_e-\varepsilon_o$) as above, and for example, the extraordinary dielectric anisotropy ($\varepsilon_e$) may be in a range of 1 to 5 or so and the ordinary dielectric anisotropy ($\varepsilon_o$) may be in a range of 4 to 40 or so.

As described above, the mesogenic compound may be a so-called N-type liquid crystal, and the absolute value of the difference ($\Delta\varepsilon=\varepsilon_e-\varepsilon_o$) between the extraordinary dielectric anisotropy and the ordinary dielectric anisotropy may be 3 or more.

The mesogenic compound may also have a phase transition temperature of at least about 20° C., at least about 30° C., at least about 40° C., or at least about 50° C. The upper limit of the phase transition temperature is not particularly limited and may be about 200° C. or lower, about 150° C. or lower, or about 120° C. or lower.

The other physical properties of the liquid crystal compound can be variously set and changed according to the driving mode and principle of the display element and such a design change is obvious to those having ordinary skill in the art.

The liquid crystal layer of the present application may further comprise a material such as a polymer network and/or an anisotropic dye according to the driving mode or principle of the display element.

In one example, the liquid crystal layer may further comprise an anisotropic dye.

In the present application, the term "dye" may mean a material capable of intensively absorbing and/or transforming light within a visible light region, for example, at least a part or the entire range within a wavelength range of 400 nm to 800 nm, and the term "anisotropic dye" may mean a material capable of anisotropically absorbing light in at least a part or the entire range of the visible light region.

As the anisotropic dye, for example, all kinds of dyes known to have characteristics capable of being oriented in accordance with the orientation of the liquid crystal compound while having the properties as above, can be used.

In one example, the anisotropic dye is a dye having the maximum absorbance in a visible light region, for example, 400 nm to 800 nm, in which an azo compound, an anthraquinone compound, a phthalocyanine compound, an azomethine compound, an indigoid or thioindigoid compound, a merocyanine compound, a 1,3-bis(dicyanomethylene)indan compound, an azulene compound, a quinophthalonic compound, a triphenodioxazine compound, an indolo[2,3,b] quinoxaline compound, an imidazo[1,2-b]-1,2,4-triazine compound, a tetrazine compound, a benzo compound, a naphtoquinone compound, or a compound having a molecular skeleton of a combination thereof, and the like can be used.

In one example, the anisotropic dye may be selected from compounds having a solubility parameter difference with the liquid crystal compound of less than about 7.4. The solubility parameter is a numerical value indicating the degree of interaction of two or more of compounds, which means that the smaller the difference in solubility parameter between the compounds, the greater the interaction and that the larger the difference in solubility parameter between the compounds, the smaller the interaction.

The solubility parameter is related to the structure of the compound, and the compound may increase the interaction of the liquid crystal compound with the anisotropic dye by having the solubility parameter difference in the above range to increase the melt-mixing property, thereby preventing the anisotropic dye from being agglomerated between themselves in the liquid crystal compound and promoting excellent dispersibility.

The anisotropic dye may have a dichroic ratio of about 1.5 to about 14. Within the above range, it may be from about 3 to 12, and within the above range, it may be from about 5 to 10. Here, the dichroic ratio is a value obtained by dividing absorption of the plane-polarized light in the direction parallel to the axis of the polymer by absorption of the polarized light in the vertical direction, and may indicate such an extent that the anisotropic dyes are arranged side by side in one direction. By having a dichroic ratio within the above range, the anisotropic dye can have sufficient compatibility with the liquid crystal compound, so that the melt mixing is possible and the orientation of the anisotropic dye according to the orientation of the liquid crystal compound can be induced.

The ratio of the anisotropic dye in the liquid crystal layer can be appropriately selected within a range that does not impair the desired physical properties. For example, the anisotropic dye may be contained in a ratio of 0.01 to 5 parts by weight or so, relative to 100 parts by weight of the liquid crystal compound, but the ratio may be appropriately changed, if necessary.

Also, the liquid crystal layer may further comprise a polymer network, and the liquid crystal compound may be dispersed in the polymer network.

That is, in the case of a so-called PDLC (Polymer Dispersed Liquid Crystal) element in which a driving method of a display element is realized by dispersing liquid crystals in a polymer matrix, the liquid crystal layer may comprise a polymer network and a liquid crystal compound dispersed in the polymer network.

In one example, the polymer network may be an orientational network of a precursor comprising an orientational compound. The term "orientational network of a precursor comprising an orientational compound" may mean, for example, a polymer network comprising a precursor comprising an orientional compound, or a polymer network comprising the cross-linked or polymerized precursor.

In the present application, the term "orientational compound" may mean a compound orientationally ordered through, for example, irradiation of light, or the like, and capable of orienting the adjacent liquid crystal compound to a predetermined direction through an interaction such as an anisotropic interaction in the orientaitonally ordered state. The compound may be a monomolecular compound, a monomeric compound, an oligomeric compound or a polymeric compound.

As the orientational compound, for example, a photo-orientational compound may be used. The photo-orientational compound may mean a compound capable of aligning in a predetermined direction by irradiation of light, for example, irradiation of the linearly polarized light, to induce orientation of the adjacent liquid crystal compound. The specific kind of the photo-orientational compound is specified in the kind of photo-orientational compound used in the vertical alignment film to be described below.

The ratio of the polymer network in the liquid crystal layer can be appropriately selected within a range that does not impair the desired physical properties. For example, the liquid crystal layer may include 20 to 50 parts by weight of the polymer network and 50 to 80 parts by weight of the liquid crystal compound, but the ratio may be appropriately changed, if necessary.

When the driving method of the display element is a guest-host liquid crystal layer comprising a liquid crystal compound and an anisotropic dye oriented by the liquid crystal compound, the liquid crystal portion of the liquid crystal layer may also comprise only a liquid crystal compound and an anisotropic dye.

When the intermediate layer included in the display element of the present application is, for example, a liquid crystal layer, the display element may further comprise a vertical alignment film. In addition, the vertical alignment film may be in contact with the liquid crystal layer to vertically align the liquid crystal compound in the liquid crystal layer.

Specifically, as shown in FIG. 2, when the light modulating layer is a liquid crystal layer, the display element according to the present application may have a structure in which a vertical alignment film is positioned on any one side of the liquid crystal layer and a vertical alignment adhesive layer is positioned on the other side.

In one example, the vertical alignment film is a photo-alignment film, which may comprise a photo-orientational compound.

In the alignment film, the photo-orientational compound may be present in a state aligned to have directionality, for example, in a state vertically aligned to the plane of the alignment film.

The photo-orientational compound may be a monomolecular compound, a monomeric compound, an oligomeric compound or a polymeric compound. In addition, the photo-orientational compound may be a compound containing a photosensitive moiety.

Specifically, as the photo-orientational compound, a compound aligned by trans-cis photoisomerization; a compound aligned by photo-destruction such as chain scission or photo-oxidation; a compound aligned by photo-crosslinking or photopolymerization such as [2+2]cycloaddition, [4+4] addition cyclization or photodimerization; a compound aligned by photo-Fries rearrangement; or a compound aligned by ring opening/closure reaction; and the like can be used.

As the compound aligned by trans-cis photoisomerization, for example, an azo compound such as a sulfonated diazo dye or an azo polymer, or a stilbene compound, and the like can be exemplified.

As the compound aligned by photo-destruction, cyclobutane-1,2,3,4-tetracarboxylic dianhydride; aromatic polysilane or polyester, polystyrene; or polyimide; and the like can be exemplified.

As the compound aligned by photo-crosslinking or photopolymerization, a cinnamate compound, a coumarin compound, a cinnamamide compound, a tetrahydrophthalimide compound, a maleimide compound, a benzophenone compound, a diphenylacetylene compound, a compound having a chalconyl moiety as the photosensitive moiety (hereinafter, a chalcone compound) or a compound having an anthracenyl moiety (hereinafter, an anthracenyl compound), and the like can be exemplified.

The photo-orientational compound may be a monomolecular compound, a monomeric compound, an oligomeric compound or a polymeric compound, or may be in a form of a blend of the photo-orientational compound and the polymer. Here, the oligomeric or polymeric compound may have a residue derived from the above-described photo-orientational compound or the above-described photosensitive moiety in the main chain or side chain.

As the polymer having the residue derived from the photo-orientational compound or the photosensitive moiety or capable of being mixed with the photo-orientational compound, polynorbornene, polyolefin, polyarylate, polyacrylate, poly(meth)acrylate, polyimide, poly(amic acid), polymaleinimide, polyacrylamide, polymethacrylamide, polyvinyl ether, polyvinyl ester, polystyrene, polysiloxane, polyacrylonitrile or polymethacrylonitrile, and the like can be exemplified, but is not limited thereto.

As the polymer that can be included in the orientational compound, typically, polynorbornene cinnamate, polynorbornene alkoxy cinnamate, polynorbornene allyloyloxy cinnamate, polynorbornene fluorinated cinnamate, polynorbornene chlorinated cinnamate, or polynorbornene dicinnamate, and the like can be exemplified, but is not limited thereto.

When the orientational compound is a polymeric compound, the compound may have a number average molecular weight of, for example, about 10,000 g/mol to 500,000 g/mol or so, but is not limited thereto.

The vertical alignment film can be formed, for example, by combining a necessary additive such as a photoinitiator to the photo-orientational compound and coating the mixture, followed by irradiation with the polarized ultraviolet rays in a desired direction.

The display element of the present application can vertically orient the liquid crystal compound in the liquid crystal layer by bringing the above-mentioned vertical alignment film into contact with the liquid crystal layer.

FIG. 2 shows a structure of a display element according to the present application when the intermediate layer is a liquid crystal layer.

That is, as shown in FIG. 2, the liquid crystal layer (500) is in contact with the vertical alignment adhesive layer (700) and the vertical alignment film (800) on both sides thereof, respectively, so that the liquid crystal compound in the liquid crystal layer (500) can be vertically oriented.

The fact that the liquid crystal compound is vertically oriented may mean a state where the surface of the liquid crystal layer and the optical axis of the liquid crystal compound in the liquid crystal layer are oriented so as to form a predetermined angle, for example, a range of 70° to 90°. The optical axis may mean a slow axis or a fast axis, but it may preferably mean a slow axis.

The light modulating layer of the display element according to the present application may also be an electrochromic material layer.

When the light modulating layer is an electrochromic material layer, the electrochromic material layer may comprise an electrochromic material.

The term "electrochromic material" may mean a material whose color changes by performing an oxidation-reduction reaction according to application of an external action, for example, voltage.

Specifically, when the intermediate layer is an electrochromic material layer comprising an electrochromic material, the display element may be an electrochromic display device (ECD) to induce light modulation using oxidation-reduction of the material.

The light modulating layer of the display element according to the present application may also be an electrophoretic material layer.

When the light modulating layer is an electrophoretic material layer, the electrophoretic material layer may comprise an electrophoretic material.

The term "electrophoretic material" may mean a material exhibiting an electrophoretic phenomenon that exhibits movement according to application of an external action, for example, voltage.

Specifically, when the light modulating layer is an electrophoretic material layer comprising an electrophoretic material, the display element may be an electrophoretic image display device (EPD) to induce light modulation using electrophoresis phenomenon of the material.

The electrochromic material and the electrophoretic material are known by Korean Laid-Open Patent Publication No. 2015-0055376, and the like, and in the present application, the known electrochromic material and electrophoretic material may be adopted without limitation and included in the electrochromic material layer or the electrophoretic material layer.

The light modulating layer of the display element according to the present application may also be a dispersed particle alignment layer. The dispersed particle alignment layer may comprise electrically dispersed particles.

In the present application, the term "electrically dispersed particles" may mean particles that can realize a transmissive mode of the display element by maintaining the orientation in a certain direction when an external action, for example, an electric field is applied, and realize a blocking mode by being oriented in any direction due to Brownian motion, and the like when no electric field is applied. The specific types of the electrically dispersed particles are also known, and in the present application, the known electrically dispersed particles can be used without limitation.

In another example, the intermediate layer may be a light emitting layer comprising a light emitting material.

In the present application, the term "light emitting layer" may mean a layer comprising a light emitting material capable of emitting light by application of the external action.

Specifically, when the intermediate layer is a light emitting layer, the display element may be an electroluminescence display element, for example, an inorganic electroluminescence display element (Inorganic ELD). In addition, the light emitting layer may comprise a light emitting material, where a specific type of the light emitting material can be, for example, a material that can be used in inorganic electroluminescence display devices, and in the present application, those disclosed in Korean Laid-Open Patent Publication No. KR2011-0020536 A, or the like can be used without limitation.

In addition, the display element of the present application may further comprise barrier rib patterns (400), as shown in FIGS. 1 and 2. The barrier rib patterns (400, 600) may serve as pillars for maintaining a constant cell gap between the first substrate (100) and the second substrate (200).

In one example, the barrier rib pattern may comprise one or more spacers. The spacer is a structure adopted to maintain the cell gap of the first substrate and the second substrate as described above, and the shape, the number of the spacers, the spacing between the spacers, or the position on the substrate, and the like can be freely designed and modified by those skilled in the art within a range of the extent to which the purposes of the present application can be achieved.

For example, the barrier rib pattern may comprise 3 to 6 main spacers and each main spacer may comprise 2 to 4 sub spacers.

As a specific example, the barrier rib pattern may comprise, for example, 6 main spacers, and each main spacer may comprise 4 sub spacers, without being limited thereto.

Also, the shape of the barrier rib pattern is not particularly limited, and may be, for example, a shape such as a circle, a triangle, or a rectangle.

The spacing between the spacers included in the barrier rib pattern is also not particularly limited, and for example, the spacers may be disposed at intervals of 20 μm to 5,000 μm or 50 μm to 1,000 μm.

In one example, the barrier rib pattern may comprise a curable resin. The kind of the curable resin is not particularly limited, and for example, a thermosetting resin or a photo-curable resin, such as an ultraviolet curable resin, can be used.

As the thermosetting resin, for example, a silicone resin, a silicon resin, a furan resin, a polyurethane resin, an epoxy resin, an amino resin, a phenol resin, a urea resin, a polyester resin or a melamine resin, and the like can be used, but is not limited thereto.

As the ultraviolet curable resin, typically, an acrylic polymer, for example, a polyester acrylate polymer, a polystyrene acrylate polymer, an epoxy acrylate polymer, a polyurethane acrylate polymer or a polybutadiene acrylate polymer, a silicone acrylate polymer or an alkyl acrylate polymer, and the like may be used, but is not limited thereto.

According to one example of the present application, the barrier rib pattern may be formed using an acrylic polymer, more specifically a polyester acrylate polymer, but is not limited thereto.

In another example, the barrier rib pattern may comprise a polymer network and a liquid crystal compound. Specifically, the barrier rib pattern may be formed by imprinting a layer of a composition comprising a polymer network and a liquid crystal compound, but is not limited thereto. As the polymer network and the liquid crystal compound included in the barrier rib pattern, the types of the polymer network and the liquid crystal layer as described above can be used without limitation.

Furthermore, when the light modulating layer according to the present application is a liquid crystal layer containing a liquid crystal compound, the barrier rib pattern may be formed using, for example, a silicone polymer. When the barrier rib pattern is formed of a silicone polymer, the silicone polymer remaining in the concave region of the barrier rib pattern can serve as a vertical alignment film, so that no additional vertical alignment film can be used for the substrate on which the barrier rib pattern exists, and thus the effects such as reduction in process and reduction in haze according to excellent orientation effect can be achieved when applied to a liquid crystal display element comprising a liquid crystal layer.

As the silicone polymer, a known polymer having a silicon-oxygen bond (—Si—O—Si—) as a main axis can be used, and for example, polydimethylsiloxane (PDMS) can be used, but is not limited thereto.

The area ratio of the barrier rib pattern located between the first substrate and the second substrate is related to the adhesion between the first substrate and the second substrate, and for example, may be about 0.1% to 50% relative to 100% of the area of the first substrate or the second substrate. In another example, the area ratio of the barrier rib pattern may be in the range of about 10% to 20% relative to 100% of the area of the first substrate or the second substrate.

The present application also relates to a method for manufacturing a display element.

According to the method for manufacturing method the display element in accordance with the present application, application of the electric field into the intermediate layer can be promoted, and the effect of substantially reducing the cell gap difference can be achieved to lower the driving voltage.

In one example, the method for manufacturing the display element according to the present application comprises, in the method for manufacturing the display element comprising a first substrate; a second substrate arranged opposite to the first substrate; and an intermediate layer positioned between the first substrate and the second substrate, a step of bonding the first substrate and the second substrate arranged opposite to each other together, with a vertical alignment adhesive layer comprising functional nanoparticles.

According to the method for manufacturing the display element in accordance with the present application, the functional nanoparticles can be contained in a predetermined amount in the vertical alignment adhesive layer to promote application of the electric field into the intermediate layer, whereby the display element having a low driving voltage due to the substantial cell gap reduction effect can be provided.

The method for manufacturing the display element according to the present application comprises a step of bonding the first substrate and the second substrate arranged opposite to each other together, with a vertical alignment adhesive layer comprising functional nanoparticles.

The first substrate and the second substrate, which are used in the method for manufacturing the display element according to the present application, may comprise a base material layer and an electrode layer, and as the base material layer, for example, a substrate in the form of a film, specifically, a film type such as a glass film, a silicone film, an inorganic film or a plastic film may be used.

A variety of known adhesion processes can be used as the method of bonding the first substrate and the second substrate arranged opposite to each other together, with the vertical alignment adhesive layer, and in particular, a roll-to-roll process easy for mass-production may also be available.

The method for manufacturing the display element according to the present application may comprise a step of coating a composition for forming a vertical alignment adhesive layer on the first substrate and then curing the composition to form a vertical alignment adhesive layer before the step of bonding the first substrate and the second substrate together.

The composition for forming a vertical alignment adhesive layer may comprise functional nanoparticles. In addition, the composition may comprise a material capable of forming a vertical alignment silicone-based adhesive, for example, a curable silicone compound.

The content of the functional nanoparticles in the composition for forming a vertical alignment adhesive layer may be, for example, an appropriate amount within such a range that the vertical alignment adhesive layer may have the desired electrical conduction characteristics or dielectric constant value.

In one example, the vertical alignment adhesive layer may comprise functional nanoparticles to satisfy the following equation 1.

$$G_i \times 100 \leq G_N \leq 1 \times 10^{10} \text{ S/m} \qquad \text{[Equation 1]}$$

In Equation 1 above, $G_N$ represents an electric conductivity value (S/m) of the vertical alignment adhesive layer comprising functional nanoparticles, and $G_i$ represents an electric conductivity value (S/m) of the vertical alignment adhesive layer comprising no functional nanoparticle.

In another example, the vertical alignment adhesive layer may include functional nanoparticles to satisfy the following equation 2.

$$C_i \times 1.5 \leq C_N \leq 50 \qquad \text{[Equation 2]}$$

In Equation 2 above, $C_N$ represents a dielectric constant value of the adhesive layer comprising functional nanoparticles and $C_i$ represents a dielectric constant value of the adhesive layer comprising no functional nanoparticle.

In addition, the composition for forming a vertical alignment adhesive layer may further comprise a solvent, and other additives.

In one example, the composition for forming a vertical alignment adhesive layer may comprise a non-polar solvent, for example, a non-polar solvent such as xylene, toluene or benzene.

As the method of coating the composition for forming a vertical alignment adhesive layer on the first substrate, any known coating method, for example a method such as bar coating, spin coating or gravure coating can be used without limitation. In addition, the method of curing the composition is also known, and for example, a method of curing by irradiation with heat or an appropriate UV light may be adopted.

When the process of curing is performed after coating the composition for forming a vertical alignment adhesive layer on the first substrate, the vertical alignment adhesive layer may be formed on the first substrate.

The method for manufacturing the display element according to the present application may further comprise a step of forming a barrier rib pattern on the second substrate. The step of forming the barrier rib pattern may be performed, for example, before the step of bonding the first substrate and the second substrate together.

The step of forming the barrier rib pattern may be performed by means of a known method such as a nanoimprint process, a photolithography process, a screen printing process, a squeezing process or a photosensitive paste process, using a UV curable resin or a PDLC composition (a polymer network precursor and a liquid crystal compound), and the kind of the raw material forming spacers of the barrier rib pattern may also vary depending on the difference in the respective processes.

When the display element according to the present application is, for example, a liquid crystal display element comprising a liquid crystal layer, the method for manufacturing a display element may further comprise a step of coating a composition for forming an alignment film comprising an orientational compound on the second substrate on which the barrier rib pattern is formed and then curing the composition to form a vertical alignment film.

The step of forming a vertical alignment film may comprise, for example, a step of coating a composition for forming an alignment film comprising the above-mentioned photo-orientational compound on the second substrate on which the barrier rib pattern is formed, and then irradiating it with an appropriate light or heat. As described above, when heat or UV light is irradiated, an alignment film having alignment properties in which the compounds are aligned in a predetermined direction, for example, vertical alignment properties can be formed.

The display element according to the present application comprises an intermediate layer between a first substrate and a second substrate.

Therefore, the method for manufacturing the display element according to the present application may further comprise a step of forming an intermediate layer positioned between the first substrate and the second substrate.

The method for forming the intermediate layer is not particularly limited, and for example, may be a method of injecting a composition for forming an intermediate layer after bonding the first substrate and the second substrate together, or a method of coating a composition for forming an intermediate layer on the second substrate before bonding, but is not limited thereto.

The material contained in the composition for forming an intermediate layer varies depending on the driving principle and mode of the display element.

In one example, when the intermediate layer is to be formed as a light modulating layer, specifically a liquid crystal layer, the composition for forming an intermediate layer may comprise a liquid crystal compound.

In addition, the composition for forming an intermediate layer may further comprise a liquid crystal compound and an anisotropic dye, and the like. In some cases, the composition may comprise a polymer capable of forming a network with the liquid crystal compound alone or in combination with the anisotropic dye. The content of the polymer capable of forming a network with the liquid crystal compound, and the anisotropic dye is as described above in the display element.

In another example, when the intermediate layer is to be formed as a light modulating layer, specifically an electrochromic material layer, an electrophoretic material layer or a dispersed particle alignment layer, the intermediate layer may be formed using a composition for forming the intermediate layer comprising a material which is necessarily contained in each layer, for example, an electrochromic material, an electrophoretic material or electrically dispersed particles.

The present application also relates to a use of the display element, for example, a display device comprising the display element.

As the kind of the display device, a smart window, a window protective film, a flexible display element, an active retarder for 3D image display or a viewing angle adjusting film, and the like can be exemplified, but is not limited thereto.

In addition, the display device may be divided into an electroluminescence display device (ELD), a liquid crystal display device (LCD), an electrochromic display device (ECD), an electrophoretic image display device (EPD) or a suspended particle display device (SPD), and the like, depending on the kind of material contained in the intermediate layer, but is not limited thereto.

Advantageous Effects

The display element according to the present application and the method for manufacturing the same can ensure excellent optical characteristics by inducing reduction of the driving voltage while ensuring a proper adhesive force by the vertical alignment adhesive layer.

BRIEF DESCRIPTION OF DRAWINGS

FIGS. 1 and 2 are schematic diagrams of the display element according to the present application.

BEST MODE

Hereinafter, a liquid crystal display element comprising a liquid crystal layer, which is one example of the display element according to the present application, will be described in more detail with reference to Examples and Comparative Examples. However, it should be apparent to those skilled in the art that the following examples are merely examples according to the present application and that the technical idea of the present application is not limited to only the liquid crystal display element.

The physical properties of the display element were measured by the following method.

1. Measurement of Peel Strength

After attaching an adhesive layer tailored to a size of 20 mm×100 mm to a support, the peel strength (unit, N/cm) was measured at a peel angle of 90° and a peel speed of 0.3 m/min using a texture analyzer (TA).

2. Measurement of Electric Conductivity of Adhesive Layer

After manufacturing a unit cell by comprising a vertical alignment adhesive layer according to Examples and Comparative Examples of the present application between a pair of substrates including an ITO electrode layer, the electric conductivity (unit, S) was measured by an LCR meter (1 kHz measurement standard) and the electric conductivity value in S/m was calculated based on the following equation 3.

$$G \times d/(x \times y)[S/m] \qquad \text{[Equation 3]}$$

In Equation 3 above, G is an electric conductivity (unit, S) measured by the LCR meter, d is a thickness (m) of an adhesive layer, and x and y are the width (x, unit m) and the length (y, unit m) of the pair of substrates including the ITO electrode layer.

3. Measurement of Dielectric Constant of Vertical Alignment Adhesive Layer

After manufacturing a unit cell by comprising a vertical alignment adhesive layer according to Examples and Comparative Examples of the present application between a pair of substrates including an ITO electrode layer, the capacitance (unit: F) was measured by an LCR meter (1 kHz measurement standard) and the dielectric constant value was calculated based on the following equation 4.

$$C \times (1/\varepsilon_0) \times d/(x \times y) \qquad \text{[Equation 4]}$$

In Equation 4 above, C is a capacitance (unit: F) measured by the LCR meter, d is a thickness (m) of an adhesive layer, x and y are the width (x, unit m) and the length (y, unit m) of the pair of substrates including the ITO electrode layer, and Co is a dielectric constant of vacuum ($8.85 \times 10^{-12}$ F/m).

4. Measurement of Driving Voltage

The change of haze values in the display element according to Examples and Comparative Examples was observed using a haze meter while gradually increasing voltage from 0 V, provided that the driving voltage was measured using the voltage at which the haze value does not change any more as a saturation voltage.

Example 1

A mixture comprising PSA type Silicon Adhesive-1 (7657 adhesive, Dow-coming) and 50 parts by weight of ITO (indium tin oxide) nanoparticles (ANP) relative to the entire solid content was coated on an ITO transparent electrode layer of a PET (polyethylene terephthalate) film (100 mm×100 mm) (hereinafter, the first substrate), on which the ITO transparent electrode layer was deposited, to a thickness of 15 μm and then heat-treated in an oven at 130 for 5 minutes to form a vertical alignment adhesive layer. Subsequently, a honeycomb type barrier rib pattern was formed on an ITO (indium tin oxide) transparent electrode layer of a PET (polyethylene terephthalate) film (100 mm×100 mm) (hereinafter, the second substrate), on which the ITO transparent electrode layer was deposited, using a polyester acrylate polymer (barrier rib spacing 250 μm, width 20 μm and thickness 15 μm, area ratio 30%). Subsequently, a vertical alignment film (vertical alignment film 5661, Nissan Chemical) was coated on the second substrate, on which the barrier rib pattern was formed, to a thickness of 200 nm, and then a Dye-LC composition, in which a liquid crystal compound (HCM009, HCCH), an anisotropic dye (X12, BASF) and MAT-13-1422 (refractive index anisotropy: 0.153, dielectric anisotropy: −5.0, Merk) were mixed in a weight ratio of liquid crystal compound:anisotropic dye: MAT-13-1422=10:0.3:90, was coated to form a liquid crystal layer of DSM (Dynamic Scattering mode). Subsequently, a display element was manufactured by bonding the first substrate to the second substrate together so that PSA type Silicone Adhesive-1 was adhered to the barrier rib pattern. The electric conductivity, dielectric constant value and peel strength of the vertical alignment adhesive layer according to Example 1 and the driving voltage of the display element were shown in Table 1.

Example 2

A display element was manufactured in the same manner as in Example 1, except that the vertical alignment adhesive layer was formed using a mixture comprising PSA type Silicon Adhesive-1 (7657 adhesive, Dow-coming) and 20 parts by weight of ITO nanoparticles (ANP) relative to 100 parts by weight of the entire solid content. The electric conductivity, dielectric constant value and peel strength of the vertical alignment adhesive layer according to Example 2 and the driving voltage of the display element were shown in Table 1.

Example 3

A display element was manufactured in the same manner as in Example 1, except that the vertical alignment adhesive layer was formed using a mixture comprising PSA type Silicon Adhesive-1 (7657 adhesive, Dow-coming) and 50 parts by weight of silica nanoparticles (Nissan chemical) relative to 100 parts by weight of the entire solid content. The electric conductivity, dielectric constant value and peel strength of the vertical alignment adhesive layer according to Example 3 and the driving voltage of the display element were shown in Table 1.

Example 4

A display element was manufactured in the same manner as in Example 1, except that the vertical alignment adhesive layer was formed using a mixture comprising PSA type Silicon Adhesive-1 (7657 adhesive, Dow-coming) and 20 parts by weight of silica nanoparticles (Nissan chemical) relative to 100 parts by weight of the entire solid content. The electric conductivity, dielectric constant value and peel strength of the vertical alignment adhesive layer according to Example 4 and the driving voltage of the display element were shown in Table 1.

Comparative Example 1

A display element was manufactured in the same manner as in Example 1, except that an adhesive layer with vertical alignment having a thickness of 15 μm and comprising no functional particle was formed using PSA type Silicon Adhesive-1 (7657 adhesive, Dow-coming). The electric conductivity, dielectric constant value and peel strength of the vertical alignment adhesive layer according to Comparative Example 1 and the driving voltage of the display element were shown in Table 1.

Comparative Example 2

A display device was manufactured in the same manner as in Comparative Example 1, except that the thickness of the vertical alignment adhesive layer was 25 μm. The electric conductivity, dielectric constant value and peel strength of the vertical alignment adhesive layer according to Comparative Example 2 and the driving voltage of the display element were shown in Table 1.

Comparative Example 3

A display device was manufactured in the same manner as in Comparative Example 1, except that the thickness of the vertical alignment adhesive layer was 5 μm. The dielectric constant value and peel strength of the vertical alignment adhesive layer according to Comparative Example 3 and the driving voltage of the display element were shown in Table 1.

Comparative Example 4

A display device was manufactured in the same manner as in Example 1, except that the vertical alignment adhesive layer having an electric conductivity value of $6.2\times10^{-7}$ S/m was formed by controlling the type of functional particles and the compounding ratio. The electric conductivity and peel strength of the vertical alignment adhesive layer according to Comparative Example 4 and the driving voltage of the display element were shown in Table 1.

Comparative Example 5

A display device was manufactured in the same manner as in Example 1, except that the vertical alignment adhesive layer was formed using a mixture comprising 70 parts by weight of ITO nanoparticles (ANP) relative to the entire solid content. The electric conductivity and peel strength of the vertical alignment adhesive layer according to Comparative Example 5 and the driving voltage of the display element were shown in Table 1.

Comparative Example 6

A display device was manufactured in the same manner as in Example, except that the dielectric constant value of the vertical alignment adhesive layer was 3.1 by controlling the kind and content of the functional particles. The dielectric constant value and peel strength of the vertical alignment adhesive layer according to Comparative Example 6 and the driving voltage of the display element were shown in Table 1.

TABLE 1

|  | Example | | | | Comparative Example | | | | | |
| --- | --- | --- | --- | --- | --- | --- | --- | --- | --- | --- |
|  | 1 | 2 | 3 | 4 | 1 | 2 | 3 | 4 | 5 | 6 |
| Electric Conductivity (S/m, at 1 kHz) | $2.4 \times 10^{-5}$ | $2.3 \times 10^{-5}$ | $2.6 \times 10^{-8}$ | $5.5 \times 10^{-8}$ | $7.2 \times 10^{-8}$ | $7.9 \times 10^{-8}$ | $6.8 \times 10^{-8}$ | $6.2 \times 10^{-7}$ | $2 \times 10^{-5}$ | — |
| Dielectric Constant (F/m at 1 KHz) | 0.14 | 0.34 | 4.14 | 3.71 | 2.0 | 2.1 | 2.0 | — | — | 3.1 |
| Driving Voltage of Display Element (V) | 40 | 60 | 100 | 100 | 250 | 360 | 180 | 220 | 40 | 220 |
| Peel Force (N/cm) | 0.234 | 0.281 | 0.144 | 0.2 | 0.399 | 0.760 | 0.154 | 0.274 | 0.054 | 0.353 |

As can be seen from Table 1 above, when the vertical alignment adhesive layer comprises functional particles to have an electric conductivity of 100 times or more (Examples 1 and 2), or a dielectric constant value of 1.5 times or more (Examples 3 and 4) as compared with the vertical alignment adhesive layer comprising no functional particle (Comparative Examples 1 to 3), as in Examples 1 to 4, it can be confirmed that the driving voltage reduction effect of the display element is remarkably improved.

In addition, it can be confirmed that the change of the peel force is in the similar numerical range as compared with Comparative Examples. Accordingly, it can be confirmed that the display element comprising the vertical alignment adhesive layer containing the functional particles according to the present invention in a predetermined amount can significantly reduce the driving voltage while effectively securing the desired adhesive property.

However, when the display element does not include dielectric particles in the vertical alignment adhesive layer as in the case of Comparative Examples 1 to 3, it was confirmed that it could achieve excellent adhesion characteristics depending on the thickness of the adhesive layer, but the driving voltage was high.

In addition, when the vertical alignment adhesive layer containing functional particles but not satisfying Equation 1 or 2 was included in the display element as in Comparative Examples 4 and 6, it could be confirmed that the driving voltage was higher than those of Examples 1 to 3 and when the functional particles were excessively introduced as in Comparative Example 5, it was confirmed that a problem such as deterioration of adhesion could be caused, whereby it has been confirmed that it is impossible to secure adhesive properties while lowering the driving voltage as in the display element according to Examples of the present application.

EXPLANATION OF REFERENCE NUMERALS

100: first substrate
200: second substrate
101, 201: base material layer
102, 202: electrode layer
300: intermediate layer
400, 600: barrier rib pattern
500: liquid crystal layer
700: vertical alignment adhesive layer
800: vertical alignment film

What is claimed is:

1. A display element, comprising:
a first substrate;
a second substrate arranged opposite to said first substrate;
a barrier rib pattern and an intermediate layer positioned between the first substrate and the second substrate, and
a vertical alignment adhesive layer positioned between the first substrate and the intermediate layer, and between the first substrate and the barrier rib pattern,
wherein the vertical alignment adhesive layer comprises functional nanoparticles and a vertical alignment silicon-based adhesive, wherein the functional nanoparticles are selected from the group consisting of indium tin oxide (ITO) nanoparticles, silver (Ag) nanowires, and silica nanoparticles, and
wherein the vertical alignment adhesive layer imparts a vertical alignment to a material in the intermediate layer,
wherein
the vertical alignment adhesive layer comprises the functional nanoparticles so as to satisfy the following equations 1 and 2:

$$G_i \times 100 \leq G_N \leq 1 \times 10^{10} \text{ S/m} \quad \text{[Equation 1]}$$

wherein, $G_N$ represents an electric conductivity value (S/m) of the vertical alignment adhesive layer comprising the functional nanoparticles, and $G_i$ represents an electric conductivity value (S/m) of a vertical alignment adhesive layer that does not comprise the functional nanoparticles $$C_i \times 1.5 \leq C_N \leq 50 \quad \text{[Equation 2]}$$

wherein, $C_N$ represents a dielectric constant value of the vertical alignment adhesive layer comprising the functional nanoparticles and Ci represents a dielectric constant value of a vertical alignment adhesive layer that does not comprise the functional nanoparticles.

2. The display element according to claim 1, wherein the vertical alignment adhesive layer contains the functional nanoparticles in a weight ratio of 0.005% by weight to 60% by weight, based on the total weight of the vertical alignment adhesive layer.

3. The display element according to claim 1, wherein the functional nanoparticles are conductive nanoparticles or dielectric nanoparticles.

4. The display element according to claim 3, wherein the conductive particles have an electric conductivity of $1.0 \times 10^1$ S/m or more.

5. The display element according to claim 1, wherein the functional nanoparticles have a spherical nanoparticle, nanotube, nanowire, nanorod, or nanoring shape.

6. The display element according to claim 1, wherein the vertical alignment adhesive layer has a thickness in a range of 0.1 μm to 100 μm.

7. The display element according to claim 1, wherein the intermediate layer is a light modulating layer containing a light modulating material or a light emitting layer containing a light emitting material.

8. The display element according to claim 7, wherein the light modulating layer is a liquid crystal layer, an electrochromic material layer, an electrophoretic material layer, or a dispersed particle alignment layer.

9. The display element according to claim 8, wherein the liquid crystal layer comprises a liquid crystal compound.

10. The display element according to claim 9, further comprising:
a vertical alignment film positioned between the intermediate layer and the second substrate, wherein said vertical alignment film is in contact with the liquid crystal layer to vertically align the liquid crystal compound in said liquid crystal layer.

11. A display device comprising the display element of claim 1.

12. The display device according to claim 11, wherein the display device is an electroluminescence display device (ELD), a liquid crystal display device (LCD), an electrochromic display device (ECD), an electrophoretic image display device (EPD) or a suspended particle display device (SPD).

13. A method for manufacturing a display element, comprising:
providing a first substrate having a vertical alignment adhesive layer disposed thereon, wherein the vertical alignment adhesive layer comprising functional nanoparticles and a vertical alignment silicon-based adhesive, and a second substrate having a barrier rib pattern and an intermediate layer disposed thereon; and
bonding the first substrate to the second substrate such that the vertical alignment layer of the first substrate is adhered to the barrier rib pattern of the second substrate,
wherein the functional nanoparticles are selected from the group consisting of indium tin oxide (ITO) nanoparticles, silver (Ag) nanowires, and silica nanoparticles,
wherein the vertical alignment adhesive layer imparts a vertical alignment to a material in the intermediate layer, and
wherein
the vertical alignment adhesive layer comprises the functional nanoparticles so as to satisfy the following equations 1 and 2:

$$G_i \times 100 \leq G_N \leq 1 \times 10^{10} \text{ S/m} \quad \text{[Equation 1]}$$

wherein, $G_N$ represents an electric conductivity value (S/m) of the vertical alignment adhesive layer comprising the functional nanoparticles, and $G_i$ represents an electric conductivity value (S/m) of a vertical alignment adhesive layer that does not comprise the functional nanoparticles $$C_i \times 1.5 \leq C_N \leq 50 \quad \text{[Equation 2]}$$

wherein, $C_N$ represents a dielectric constant value of the vertical alignment adhesive layer comprising the functional nanoparticles and $C_i$ represents a dielectric constant value of a vertical alignment adhesive layer that does not comprise the functional nanoparticles.

14. The method for manufacturing a display element according to claim 13, wherein
the vertical alignment adhesive layer comprises the functional nanoparticles in a ratio of 0.005% by weight to 60% by weight, based on the total weight of the vertical alignment adhesive layer.

* * * * *